Nov. 6, 1962     C. A. JONSON ETAL     3,062,044
APPARATUS FOR MEASURING ELASTIC PROPERTIES
Filed Dec. 29, 1958     2 Sheets-Sheet 1

INVENTORS
CARL A. JONSON
EUGENE M. McCOLM
BY WESLEY FERRELL

Maurice B. Stiefel
ATTORNEY

Nov. 6, 1962 C. A. JONSON ETAL 3,062,044
APPARATUS FOR MEASURING ELASTIC PROPERTIES
Filed Dec. 29, 1958 2 Sheets-Sheet 2

INVENTORS
CARL A. JONSON
EUGENE M. McCOLM
BY WESLEY FERRELL

Maurice B. Stiefel
ATTORNEY 3,062,044
APPARATUS FOR MEASURING ELASTIC
PROPERTIES
Carl A. Jonson, Pequannock, Eugene M. McColm, Englewood, and Wesley Ferrell, Packanack Lake, N.J., assignors to United States Rubber Company, New York, N.Y., a corporation of New Jersey
Filed Dec. 29, 1958, Ser. No. 783,379
7 Claims. (Cl. 73—91)

The present invention is concerned with a system for predetermining the behavior of elastic material under actual service conditions, and, more particularly, the invention is concerned with a system for predetermining the behavior of polyamide fiber as the carcass of a pneumatic tire.

Heretofore, the only satisfactory method for determining the performance of nylon as the carcass of pneumatic tires was to build the tires and test them under actual service conditions. Some of the disadvantages in using nylon for this purpose are that it shrinks upon being cured, it grows with use with attendant reduced life stemming from groove and shoulder cracking, etc. and it flat spots with the consequences of causing discomfort to the driver and causing further reduced life. The time consumed in evaluating the various factors contributing to short life of tires containing carcasses of nylon is enormous, thus bearing testimony to the urgent need for an effective and less time-consuming laboratory test procedure for the same purpose. The present invention is concerned with such a system.

Therefore, an object of this invention is to provide a system for evaluating elastic materials such as nylon cord whereby it can be predetermined with reasonable accuracy how the material will perform under actual service conditions.

Other objects and advantages will become apparent from the following description and explanation thereof.

In the system of the present invention two axially aligned vertical shafts are provided with supporting means on their adjacent ends for holding a loop of elastic material therebetween. The upper shaft contains a driving means associated with it for imparting a reciprocating action thereto, whereas the lower shaft contains a damping means whereby the reciprocating movement imparted by the upper shaft to the looped material is not transmitted to the lower shaft. Consequently the elastic material is subjected to continuous stretch and retraction and with time the material undergoes a permanent elongation. Such change is indicated by a change in the vertical position of the lower shaft and recorded by conventional means.

The elastic material may be any kind which lends to evaluation by the system of the present invention. The primary application will be for testing polyamide cord, the strands of which have a denier of about 2000 to 400. The polyamide may be nylon, e.g. adipic acid-hexamethylene diamine polymer or modified polymer with other bifunctional compounds, or Perlon made from caprolactam.

To provide a better understanding, reference will be had to the accompanying drawings wherein.

Figure 1:
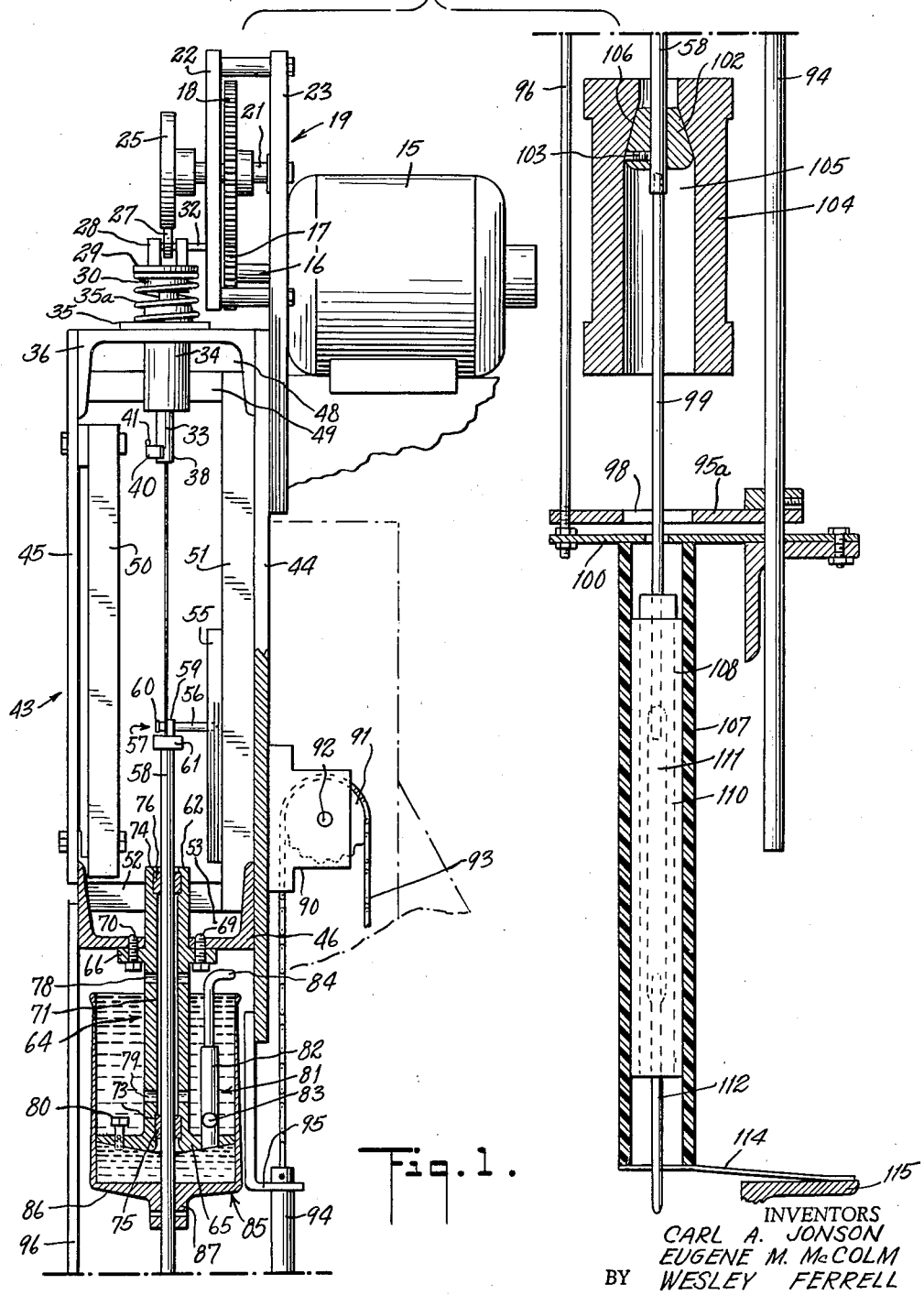
FIGURE 1 is a plane elevation of a specific embodiment of the testing apparatus.
Figure 2:
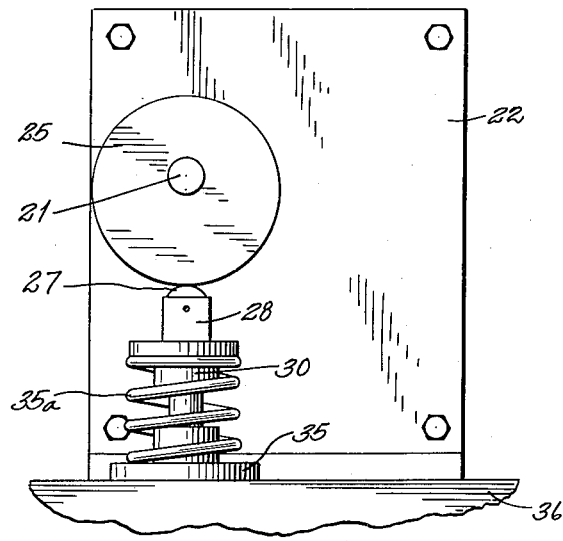
FIGURE 2 is a side view of the eccentric cam mechanism for reciprocating the upper shaft.
Figure 3:
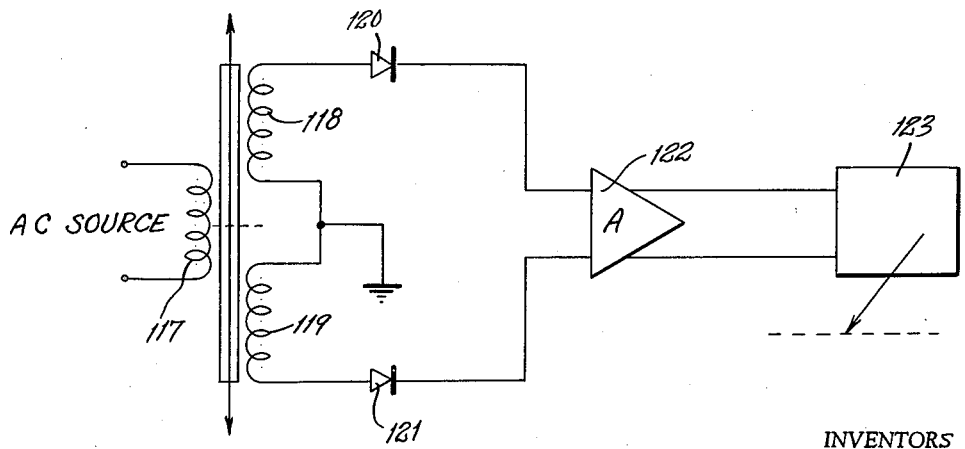
FIGURE 3 is a schematic wiring diagram of the length change detection system.

In the drawings a motor 15 containing a driving shaft 16 on which is mounted a pinion gear 17 engages a larger or driving gear 18. The larger gear 18 and the pinion gear 17 are contained within a gear box 19. Gear 18 is mounted on a shaft 21 which has its ends mounted in the sides 22 and 23 of the gear box. One end of the shaft 21 extends beyond the side 22 of the gear box 19 and supports an eccentric cam 25 thereon. The periphery of the eccentric cam 25 is in contact with a ballbearing roller 27, which roller is supported within the slotted opening of a circular support 28. The support 28 rests on a platform 29 from which depends a shoulder 30. In this example, the parts 28, 29 and 30 are integral. The ballbearing roller 27 is held within the slot of the circular support 28 by means of a shaft or pin 32. One end of the shaft 32 extends beyond the support 28 in the direction of the gear box 19. This projecting end of the pin 32 engages a vertical slot (not shown) which is contained in the side 22 of the gear box 19. The arrangement of the pin 32 within the slot serves as a vertical guide to prevent rotation of the ballbearing roller. Shaft 33 has its upper end frictionally held within a bronze bushing contained within the shoulder 30 of the bearing support. The lower portion of the shaft 33 is positioned within a guide bushing 34. The guide bushing 34 contains a flange 35 which is welded or otherwise held to the top channel 36 of an oven box to be described hereinafter. A helical spring 35a is positioned between shoulder 30 and the top of guide bushing 34. The lower end 38 of the shaft 33 is notched to provide a flat vertical surface. The flat surface contains a threaded opening for engagement with an Allen screw 40 which has a flange or lip 41 at its free end. The flange 41 serves to keep the nylon cord from sliding or falling off during the operation of the apparatus. This will be better understood in the later description of the apparatus.

The channel 36 constitutes the top of an oven 43. The oven 43 also contains sides 44, 45 and a bottom channel 46. The extended vertical side 23 of the gear box 19 is fastened to the side 44 of the oven in order to maintain the gear box in a vertical position as shown in the drawing. The inside of the oven contains insulation resting against members 36, 44, 45 and 46 and designated as numerals 48, 49, 50, 51, 52 and 53. There is fastened to the side 44 of the oven 43 a metal strip 55 which contains a vertical slot (not shown) which engages the extended end 56 of Allen screw 57. This arrangement serves to keep the shaft 58 from turning in its vertical movement. As in the case of shaft 33, shaft 58 contains the upper end 59 notched to provide a flat vertical surface. The flat surface contains a threaded opening for engagement with the Allen screw 57. One end of the Allen screw contains a flange or lip 60 whereas the other end is positioned within a slot as aforementioned. A collar or stop 61 is mounted on the upper part of the shaft 58 to prevent the Allen screw 57 from striking against the end of the piston arm 62 in the event of breakage of the cord being tested.

The shaft 58 is positioned within a bore 71 of a piston assembly 64 consisting of an arm 62 and a piston 65. The piston assembly is circular in cross-section. The upper part of the piston arm 62 contains a flange 66 which is fastened to the bottom 46 of the oven by means of bolts 69 and 70. The diameter of the bore 71 is sufficient to prevent the shaft from contacting the piston arm. The bore 71 communicates with enlarged bores 73 and 74 at each end. Ballbearings 75 and 76 are positioned within the bores 73 and 74, respectively. The ballbearings 75 and 76 serve to guide the shaft in its vertical movement and maintain it in axial alignment relative to the piston arm. Between the piston 65 and flange 66 of the piston assembly are two sets of opposing transverse openings which communicate with the bore 71. One set of openings designated as numeral 78 is in proximity to the flange 66, whereas the other set of openings designated as 79 is in proximity to the bearing 75. An adjustable needle valve 80 is connected to an opening in one side of the piston 65, and on the other side thereof a valve 81 is connected to an opening in the piston 65. The needle valve 80 regulates the size of passage which communicates between the region below the piston 65 with that above it. The valve 81 is an open and shut type valve, and it also enables communication by means of a relatively large opening between the area below the piston 65 with that above it. The valve 81 consists of a sleeve 82 which is threadably engaged with an opening in the piston 65. The sleeve contains an opening 83 just above its connection to the piston 65. A valve stem 84 fits within the sleeve 82 and contains a plug portion (not shown) which provides communication between the opening in the piston with that in the sleeve. The piston 65 fits snugly within a dash pot 85 for vertical movement therein. The dash pot 85 is circular in cross-section and has an open upper end and a bottom 86. The bottom 86 of the dash pot 85 contains a flange 87 which is mounted on the shaft 58 in a leak-proof manner.

Upward or downward displacement of the shaft 58 causes similar displacement of dash-pot 85, which is firmly attached to shaft 58. Piston 65, being firmly attached to channel 46, remains stationary. However, piston 65 moves relatively to dash-pot 85 by virtue of the movement of the latter. When valve 81 is closed and valve 80 adjusted to permit only a very small flow of oil, the piston 65 and dash-pot 85 serve to damp out reciprocating motions having a short period (vibrations) but do permit axial displacement of the shaft 58 by motions of relatively long period (such as would be caused by changes in length of the test specimen).

A pulley support 90 is fastened to the side 44 of the oven at the lower part thereof. A pulley 91 is mounted on a shaft 92 which is held by the support 90. A chain 93 is supported on the pulley with one end being connected to a crank (not shown) and the other end being connected to the top of a vertical lifting bar 94. The lifting bar 94 is guided at its upper end by means of a guide or bracket 95. The guide bracket 95 is fastened to the lower end of oven side 44. The lower intermediate part of the lifting bar 94 is fastened to a movable platform 95a, whereas the lower end is guided by an opening in a stationary platform 100. The end of the platform 95a which is opposite the connection of the arm 94 therewith slides on a vertical rod or guide 96. The vertical guide or rod 96 has its lower end bolted to the stationary platform 100 and its upper end fastened to the channel 46 of the oven. The center of the movable platform 95a contains an opening 98 so that the shaft 99 can pass through freely.

Shaft 99 is of reduced cross-sectional area relative to shaft 58. The upper end of shaft 99 is threaded within the lower end of shaft 58. An adjustable weight support 102 is fastened to shaft 58 just above its connection with shaft 99. Weight support 102 is held in position by means of a set screw 103. The weight 104 contains a longitudinal opening 105 having a reduced cross-sectional area at the upper end thereof. The weight 104 rests on the support 102 at the swaged portion 106. The weight 104 is in an elavted position above the lifting platform 95a. However, by cranking the chain 93, the platform 95a may be raised to where it lifts the weight off the support 102.

A plastic housing 107 is positioned with its upper end abutting against the bottom of the stationary platform 100. The plastic housing is made in this example of Lucite. A differential transformer 108 fits snugly within the housing 107. The differential transformer contains a bore 110 in which moves freely a magnetic sintered iron core 111. The lower end of shaft 99 is threadably engaged with the upper end of the iron core 111. Still another shaft 112 is threadably connected with the lower end of the iron core 111. The lower end of the plastic housing is fastened to a supporting member 114 which in turn is fastened to an angle iron 115. The shaft 112 passes through an opening in the member 114.

The differential transformer consists of a primary coil 117 and two secondary coils 118 and 119. The secondary coils are electrically connected so that the currents generated within each are made to oppose each other. The primary coil of the transformer is connected to a 400 cycle oscillator (A.C. source) and requires approximately 5–6 volts for energization. When the iron core is centrally located with respect to the transformer the voltages generated within the secondary coils are equal and, therefore, cancel each other. The secondary coils are connected to rectifiers 120 and 121 of the selenium type so that the A.C. generated can be converted to D.C. The D.C. is then passed to a D.C. amplifier 122 so that the voltage is stepped up to a suitable level for operation of an instrument 123 which records continuously vertical movement of shaft 58 with time.

From an examination of the drawings it is apparent that the shafts are in axial alignment. This arrangement is necessary in order that the nylon thread to be evaluated can be subjected only to a tensile stress. In the operation of the apparatus, the rotation of the eccentric cam causes the bearing support 28 to move up and down in regular cycles. A loop of nylon cord tied with surgeon knots is placed over the Allen screws 40 and 57. The total force applied on the nylon cord, without the application of weight 104, is one-half pound. The reciprocal movement of the shaft 33 is not imparted to the shaft 58 by reason of the damping action of the dash pot in relation to the piston assembly 64. When the apparatus is in operation, valve 81 is closed and needle valve 80 is adjusted to provide an opening too small to permit the piston assembly 64 to respond to the reciprocating action of the shaft 33. The damping action is created by having the dash pot filled with oil of the lubricating type and any upward or downward thrust on shaft 58 does not materialize as a vertical movement because the oil contained in the dash pot does not have sufficient time to flow between the region below the piston 65 and that above it. As the operation continues for a prescribed period of time, the nylon cord stretches or grows, and when this occurs, the shaft 58 moves downwardly by reason that oil or fluid is able to pass from above the piston 65 to below it through the needle valve 80. Such vertical movement of shaft 58 is transmitted to shaft 99, and in turn the position of the iron core 111 of the differential transformer is changed, showing as a change in the position of the needle of the recording instrument 123 through the electrical impulse generated. The electromotive force is generated as a differential between the secondary windings 118 and 119, rectified and amplified for actuation of the recorder 123 as aforedescribed.

In actual tests, for each different sample of tempered polyamide, two cords were used which were termed the "A cord" and the "B cord." The cords were first heated to 350° F. under a one-half pound load and the shrinkage measured with dash pot valve 81 open. This value is termed "Percent Cure Shrinkage, R.T. to 350° F." The cords are then cooled to room temperature and the elongation measured. This value is termed "Thermo Elastic Length Change, 350° F. to R.T." The load is next raised from one-half pound to 0.472 gram per denier at R.T. and the elongation after one minute measured. This is termed "Percent One Minute Elongation at R.T., 0.472 gram/denier Loading." Heating was then begun and when 250° F. was reached the temperature was maintained at that level. This usually takes a little less than ten minutes, but after ten minutes a measurement of length change is made. This value is termed "Static Growth Plus Thermo Elastic Length Change, R.T. to 250° F." A dynamic stretch and relaxation of about 2% amplitude and at such a frequency as to simulate the dynamic action in a cord in a tire at 60 m.p.h. was then effected by means of the power driven cams and continued for thirty minutes. The growth occurring during this period was termed "Percent Dynamic Growth at 250° F." The sum of "Percent One Minute Elongation" plus "Static Growth plus Thermo Elastic Length Change" plus "Percent Dynamic Growth" is denoted "Total Growth."

Up to this point both A and B cords were treated the same. From here on, their treatment was different. The dynamic action was stopped and the load on the A cord was maintained, to simulate cords in a hot tire at rest, not passing through the footprint. The load on the B cord was reduced to one-half pound to simulate sections of cord in the footprint. The retraction of the B cord was measured after one minute and was termed "Percent One Minute Retraction of B Cord at 250° F., One-half Pound Load."

The cords were maintained at 250° F. for ten minutes to simulate slow cooling of a hot tire, then cooled rapidly to room temperature and after a total time of one-half hour any length change is measured. This is termed "Percent Length Change on Cooling to R.T., A and B Cords."

The B cord is then reloaded to 0.472 gram/denier and the elongation measured after one minute. This is termed "Percent One Minute Elongation of B Cord at R.T., 0.472 gram per denier." The difference in length between A and B cords (expressed as a percent of the original length) at this point is termed "Depth of Flat Spot-Initial." The dynamic cam action was then begun at room temperature and continued for ten minutes. The growth occurring was termed "Percent Total Dynamic Growth in Ten Minutes at R.T., A and B Cords."

Finally, the difference in length between A and B cords after this dynamic action (expressed as a percent of the original cord lengths) is termed "Depth of Flat Spot After Ten Minutes Run-Out."

The data obtained by testing cord in the apparatus described above was compared with data obtained under actual service conditions. In this regard the percent cure shrinkage from room temperature to 350° F. correlates with the shrinkage of the cord within the tire as it is being cured. The greater the cure shrinkage the more the tire will undergo contraction upon curing. By a careful comparison of the data it was found that a percent cure shrinkage of greater than 3.5% is considered poor. A percent cure shrinkage of 2.75 to 3.5% is considered fair while any rating less than 2.75% is considered good. As to the initial flat spot depth for 1680/2 nylon cord, a value of at least 1.35 is considered fair to poor, whereas a value in the range of 1 to less than 1.35 is considered good and anything below 1.0 is considered to be exceptional. The percent total growth for this cord is rated good at values of less than 4.0%. At a value greater than 5% the percent total growth has a poor rating, whereas the intermediate range of 4.0 to 5.0% is fair.

Having thus provided a description of our invention along with a specific example thereof, it should be understood that the scope thereof is defined by the appended claims.

We claim:

1. An apparatus comprising two vertically movable shafts in axial alignment with each other and having spaced opposing ends, supporting means on each opposing end adapted for holding a looped elastic material therebetween, driving means rapidly reciprocating the upper shaft in a vertical direction, damping means associated with the lower shaft to prevent the movement thereof in response to the transmitted rapid reciprocating action of the upper shaft and to permit the movement thereof in response to any change in length of the looped material, and means associated with the lower shaft whereby any change in vertical position thereof is indicated.

2. The apparatus of claim 1 wherein the damping means comprises an open ended cylinder concentrically positioned on and fastened to the lower shaft, a piston containing a long hollow stem connected thereto fixedly mounted in a concentric position and surrounding the lower shaft, said piston being positioned within the cylinder and containing an adjustable opening, the piston, cylinder and adjustable opening being so arranged that liquid in the cylinder is restrained from flowing through the adjustable opening in response to the reciprocating action of the upper shaft and thereby creating a damping effect.

3. The apparatus of claim 2 further incorporating indicating means comprising a differential transformer positioned below the lower shaft, the iron core of said transformer being fastened to the bottom end of the lower shaft, so as to be displaced vertically by vertical displacements of said lower shaft and means for rectifying and amplifying the voltage generated by movement of said core and recording the same as a linear movement.

4. The apparatus of claim 1 being further characterized by having the portion of shafts containing the supporting means within an enclosure, and means whereby the enclosure is heated to maintain the looped elastic material at an elevated temperature.

5. An apparatus comprising two axially aligned vertical shafts, the adjacent ends of said shafts being provided with hangers whereby a looped elastic material may be held therebetween, an eccentric cam being positioned above the upper shaft with its periphery engaging the top thereof, means to rotate the eccentric cam and thus impart a reciprocating action to the upper shaft, an open-ended cylinder adapted to contain liquid and being affixed concentrically on the lower shaft, a piston containing a hollow connecting rod slideably mounted concentrically on the lower shaft with the piston slideably fitted within the cylinder, an adjustable opening in said piston of such size that liquid contained in the cylinder is restrained from flowing therethrough in response to the reciprocating action of the upper shaft whereby a damping effect is created but such liquid is permitted to flow through said opening when the looped material undergoes beyond the elastic limit or undergoes retraction whereby a change in the vertical position of the lower shaft is effected, and means for indicating any change in the vertical position of the lower shaft.

6. The apparatus of claim 5 wherein the lower shaft is a weighted shaft.

7. The apparatus of claim 5 wherein a weight is slidably mounted on the lower shaft to permit engaging of said weight to transmit its load to said lower shaft and the disengaging thereof.

References Cited in the file of this patent

UNITED STATES PATENTS

| | | |
|---|---|---|
| 1,347,291 | Price | July 20, 1920 |
| 1,490,762 | Boyd | Apr. 15, 1924 |
| 1,923,296 | Castricum | Aug. 22, 1933 |
| 2,414,318 | Middel | Jan. 14, 1947 |
| 2,612,040 | Rhodes | Sept. 30, 1952 |
| 2,641,128 | Black | June 9, 1953 |

UNITED STATES PATENT OFFICE
CERTIFICATE OF CORRECTION

Patent No. 3,062,044

November 6, 1962

Carl A. Jonson et al.

It is hereby certified that error appears in the above numbered patent requiring correction and that the said Letters Patent should read as corrected below.

Column 6, line 20, after "shaft" strike out the comma and insert the same after "shaft" in line 21, same column 6; same column 6, line 47, before "beyond" insert -- growth --.

Signed and sealed this 29th day of December 1964.

(SEAL)
Attest:

ERNEST W. SWIDER
Attesting Officer

EDWARD J. BRENNER
Commissioner of Patents